(12) United States Patent
Scally et al.

(10) Patent No.: US 6,401,021 B1
(45) Date of Patent: Jun. 4, 2002

(54) MEMORY SEAT AND POWER WALK-IN CONTROL

(75) Inventors: John Scally, Marysville; Hirohide Suda, Dublin, both of OH (US)

(73) Assignee: Honda Giken Kogyo Kabushiki Kaisha, Tokyo (JP)

( * ) Notice: Subject to any disclaimer, the term of this patent is extended or adjusted under 35 U.S.C. 154(b) by 0 days.

(21) Appl. No.: 09/702,542

(22) Filed: Oct. 31, 2000

(51) Int. Cl.$^7$ .................................................. G06F 7/00
(52) U.S. Cl. ..................... 701/49; 296/65.01; 296/65.17; 318/452
(58) Field of Search .................... 701/1, 33, 36, 701/49; 297/232; 296/64, 65.01, 65.05, 65.07, 65.08, 65.15, 65.17; 318/445, 452, 466, 568.1; 307/10.1

(56) References Cited

U.S. PATENT DOCUMENTS

| | | | | |
|---|---|---|---|---|
| 4,845,415 A | * | 7/1989 | Steely ..................... | 318/568.1 |
| 4,900,079 A | * | 2/1990 | Obara et al. .................. | 296/64 |
| 5,081,586 A | * | 1/1992 | Barthel et al. ................ | 701/49 |
| 5,187,665 A | * | 2/1993 | Futami et al. ................ | 701/49 |

\* cited by examiner

Primary Examiner—William A. Cuchlinski, Jr.
Assistant Examiner—Edward Pipala
(74) Attorney, Agent, or Firm—Rankin, Hill, Porter & Clark LLP

(57) ABSTRACT

A power seat control system that includes memory seat recall and power walk-in functions. When power walk-in is initiated while memory seat recall is being performed, the control system suspends memory seat recall until power walk-in is complete. Following power walk-in, memory seat recall is resumed to drive the seat into the desired final position. When a memory seat recall switch is actuated during power walk-in, the power walk-in function is aborted. Subsequent re-actuation of the memory seat recall switch will result in performance of the memory seat recall function to drive the seat to the desired final position.

7 Claims, 4 Drawing Sheets

MEMORY SEAT AND POWER WALK-IN CONTROL

BACKGROUND OF THE INVENTION

1. Field of the Invention

The present invention is generally directed toward automobile seats and, more particularly, to power seat control systems.

2. Description of the Related Art

A power seat typically includes plural motors to facilitate repositioning of the seat in several different planes and about different axes. For example, the seat may be moved horizontally forward/backward, may be moved vertically up/down, may have the front and rear of the seat tilted forward/backward, may have the seat back reclined or angled forward/backward, and may have the lumbar support adjusted in/out. Due to the great number of possible adjustments, to accommodate individual preferences, and to facilitate placement of the seat in the exact desired final position, some luxury automobiles include a memory seat recall function.

The memory seat recall function stores a plurality of desired seat positions in memory. Upon initiation of the memory seat recall operation, the seat is moved about the various planes and axes into a selected one of the stored desired seat positions. The memory seat recall function is typically actuated by a push-button or multi-position switch that may be disposed on the dashboard, control panel, or inside surface of the automobile door. In order to determine the seat position, several seat position sensors are provided, as is well known in the art.

Power walk-in is another power seat option that is popular on two-door automobiles. A power walk-in operation is initiated by folding-up of one of the seat backs. Folding-up the seat back actuates a switch that operates one of the power seat motors, referred to as the slide motor, to drive the seat toward a full-forward position. When the seat back is returned to the upright position, another switch is actuated to reverse the slide motor and cause the seat to be driven rearwardly away from the full-forward position. Normally, the seat stops at an arbitrary position or may stop at the location occupied prior to initiation of the power walk-in operation.

In power seats having both the power walk-in and the memory seat recall functions, a conflict arises when both functions are contemporaneously activated by the user. There is a need in the art for a power seat control system that is sensitive to the desired purposes of these power seat functions and to optimization of the operating sequence. There also exists a need in the art for a control system that will place the seat in the final position selected by the user.

SUMMARY OF THE INVENTION

The present invention is directed toward a power seat control system adapted to resolve conflicts that arise due to simultaneous or contemporaneous actuation of the power walk-in function and the memory seat recall function. The present invention is further directed toward a power seat control system that places the seat in a desired final position even when the power walk-in and memory seat recall functions are contemporaneously activated. The present invention is also directed toward a control system wherein all desired power walk-in and memory recall operations are performed, and wherein the seat arrives in the desired final position without the need for the user to repeat commands.

BRIEF DESCRIPTION OF THE DRAWINGS

These and further features of the present invention will be apparent with reference to the following description and drawings, wherein.

DETAILED DESCRIPTION OF THE PREFERRED EMBODIMENTS

In the following description the action of the slide motor during the power walk-in and memory seat recall operations is discussed. It is noted that, at least for memory seat recall operations, other motors are also operating to properly position the seat. However, it is noted that the slide motor is the only motor used for both memory seat recall and power walk-in. Accordingly, operation of the other motors is not discussed further hereinafter.

Initially, it is noted that certain operating conditions are prerequisites to performance of the power walk-in or the memory seat recall. For example, for performance of the power walk-in operation, the door adjacent the seat to be moved must be open, the automobile must be in park. For performance of the memory recall operation, the automobile must be in park and the automobile speed must be zero.

With reference to drawing FIGS. 2–7, each of these drawings illustrate operation of the present invention in a series of interrelated graphs. The memory recall graph indicates whether the memory recall function has been initiated by actuation of the memory recall button/switch. The power walk-in graph indicates the condition of the seat back wherein forward (FWD) and reverse (REV) correspond to whether the seat back has been folded forward to the folded-up position or back to the upright position, respectively. The slide motor graph indicates the direction of movement, forward (FWD) or reverse (REV) of the slide motor and, hence, the seat. The seat position graph indicates the relative position of the seat between an arbitrary initial position (A), a predetermined position or desired final position ($P_x$) and the full forward position (FF).

Figure 2:
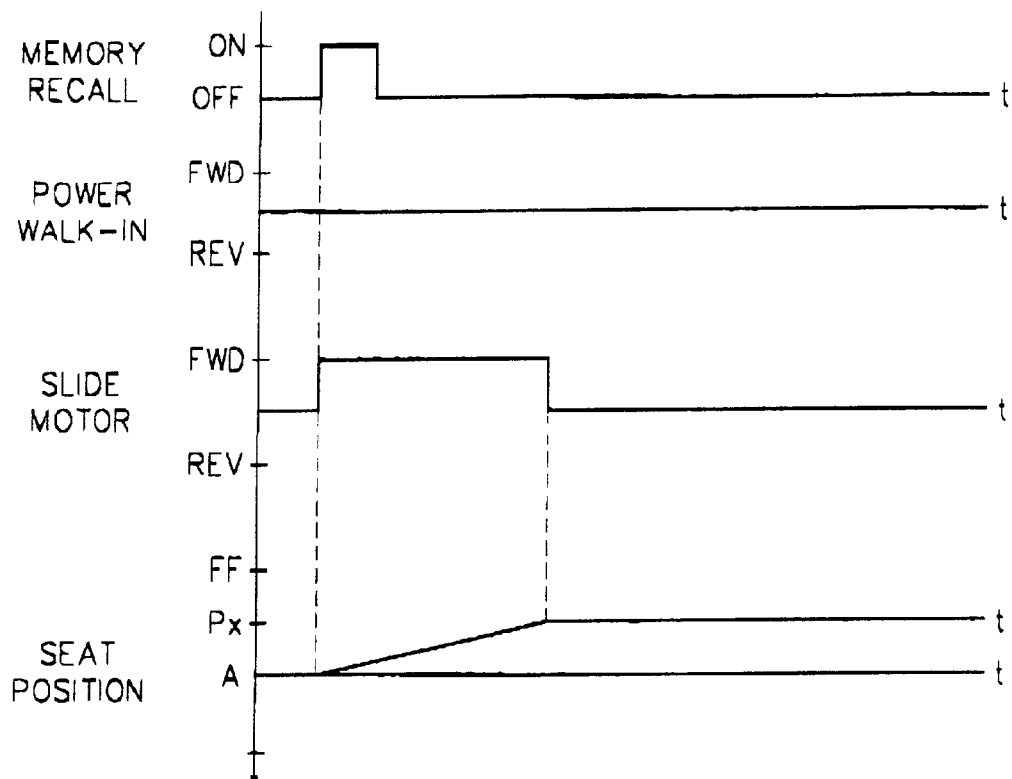
FIG. 2 schematically illustrates movement of the seat during a memory seat recall operation.

With reference to FIG. 2, a basic memory seat recall operation is illustrated wherein the user has started the memory seat recall operation upon the actuation of a memory recall button. Upon activation of the button, the slide motor is activated to move from an arbitrary position (A) to a desired final position ($P_x$) or predetermined position. In FIG. 2, the slide motor is operated to move the seat from an arbitrary rearward position to a more forward position.

Figure 3:
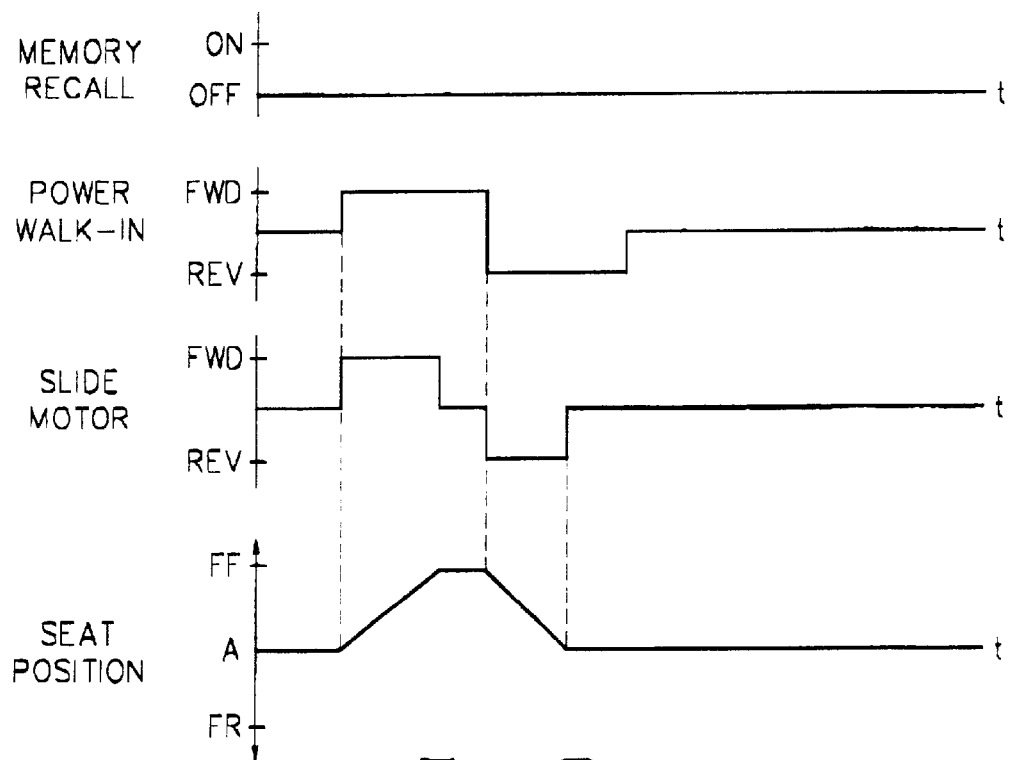
FIG. 3 schematically illustrates movement of the seat during a power walk-in operation.

With reference to FIG. 3, a basic power walk-in operation is illustrated wherein power walk-in is actuated by the user folding the seat back from a normal, upright position forwardly to a folded-up position. The seat includes first and second limit switches that are operable to activate the power walk-in function. When the seat back is folded forwardly, the first limit switch in the seat is actuated (closed) and the second limit switch is deactuated (opened), to thereby start the power walk-in operation. The seat moves forwardly from an arbitrary starting position (A) to a full-forward position (FF). Upon reverse pivoting of the seat back to the upright position, the second limit switch in the seat is actuated (closed) and the first limit switch is deactuated (opened), to start the second part of the power walk-in operation wherein the seat returns to the original starting position. It is noted that the power walk-in operation can be prematurely interrupted whereby, prior to the slide motor reaching the full-forward position, the seat is pivoted from the folded-up position to the upright position. Assuming that memory seat recall is not being performed, whenever the seat is returned to the upright position, the second limit switch is actuated and the slide motor moves the seat backward toward the original position (A).

The power seat control system according to the present invention is operable in first and second modes. A first mode corresponds to the situation wherein the power walk-in function is initiated by the seat being folded-up and, during power walk-in, the user attempts to initiate memory seat recall by actuating the memory seat recall button/switch. In this situation, the attempted initiation of the memory seat recall operation during the power walk-in operation serves to cancel the power walk-in operation.

However, in the first mode of operation cancellation of the power walk-in operation will not automatically begin the memory seat recall operation. Rather, the seat will remain stationary until the seat back is returned to the upright position. When the seat back is returned to the upright position, the seat will move back to the starting position (A).

Hereafter, operation of the power seat control system in a second mode of operation, wherein the power walk-in function is initiated during performance of a memory seat recall function, is discussed with reference to the examples depicted in FIGS. 4–7.

Figure 4:
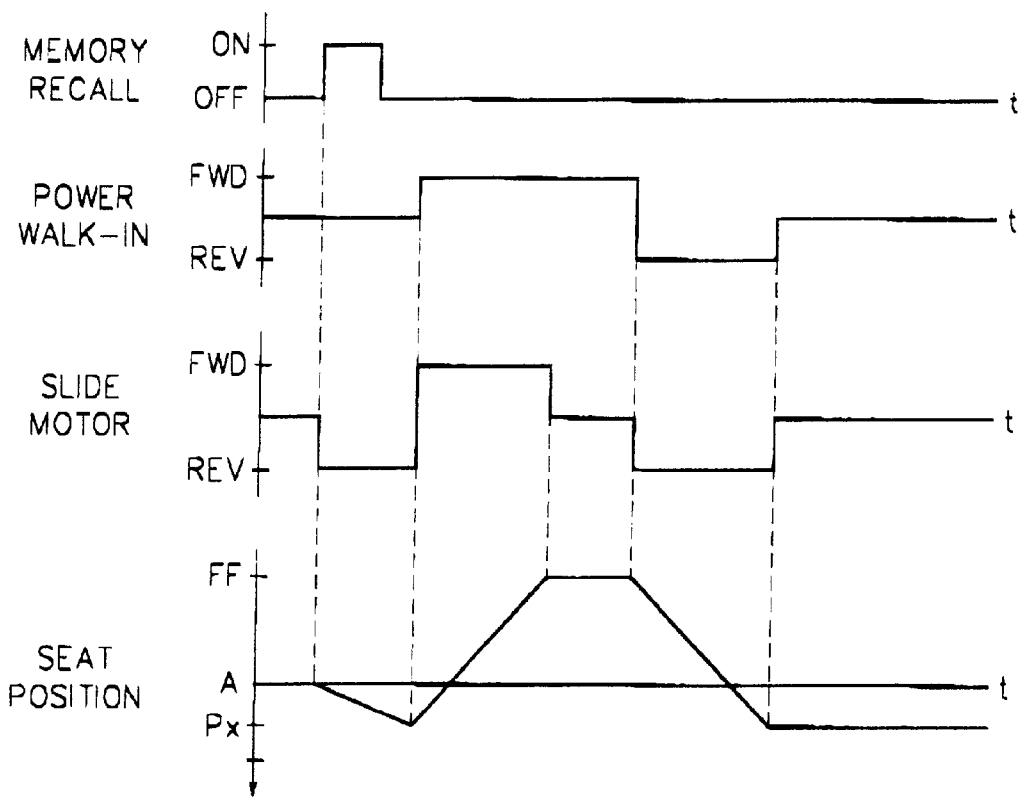
FIG. 4 schematically illustrates a first example of a second mode of operation of the power seat control according to the present invention.

Turning to FIG. 4, a first example for the second mode of operation is illustrated wherein the desired final position ($P_x$) is rearward of the initial position (A). The memory seat recall operation is initiated and the seat moves from the arbitrary initial position (A) rearwardly toward a desired final position ($P_x$). Before the seat reaches the desired final position ($P_x$), the power walk-in operation is initiated by the user folding the seat back from the upright position into the folded-up position.

Upon initiation of the power walk-in operation, the memory seat recall operation is suspended and the slide motor reverses to move the seat toward the full-forward position (FF). The seat is therefore moved to the full-forward position (FF) at the front of the track and is maintained at the front of the track until the seat back is returned to the upright position. When the seat back is returned to the upright position, the memory seat recall operation is resumed, and the slide motor thereafter operates to move the seat directly to the desired final position ($P_x$), without any further action by the user.

Figure 5:
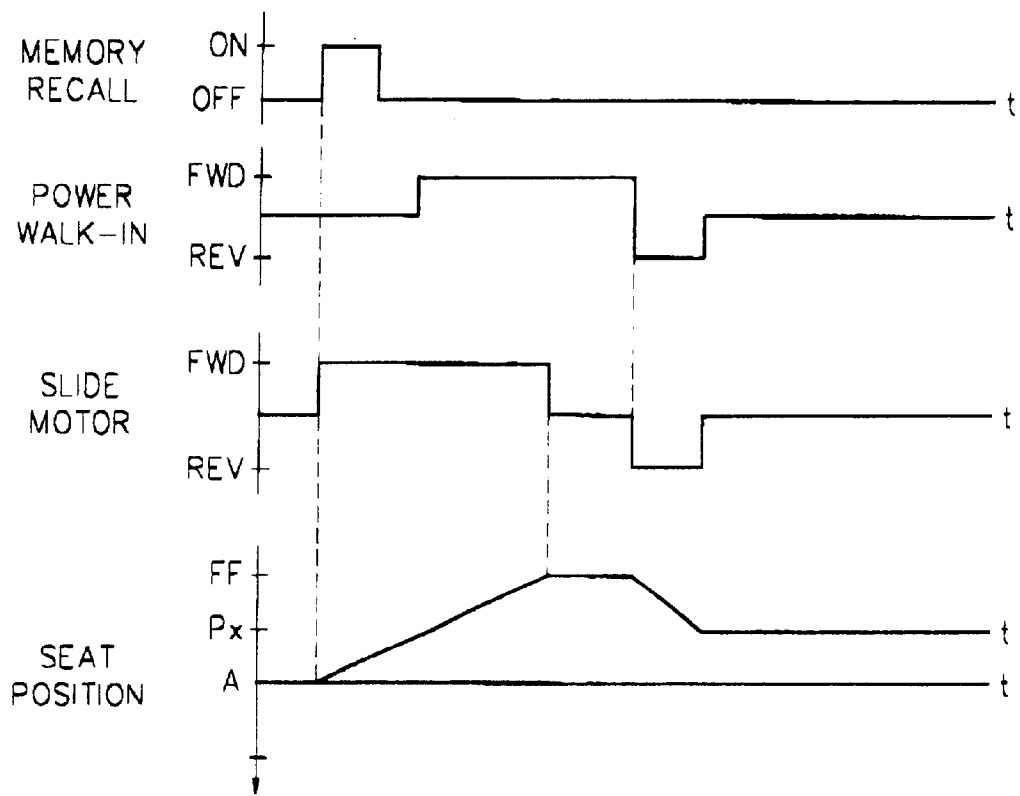
FIG. 5 schematically illustrates a second example of the second mode of operation of the power seat control according to the present invention.

Turning to FIG. 5, a second example of the second mode of operation is illustrated wherein the desired final seat position ($P_x$) is between the initial position (A) and the full-forward position (FF). The memory seat recall operation is initiated and the seat moves from the arbitrary initial position (A) forwardly toward a desired final position ($P_x$). Before the seat reaches the desired final position ($P_x$), the power walk-in operation is initiated by movement of the seat back into the folded-up position.

Upon initiation of the power walk-in operation, the memory seat recall operation is suspended. However, the slide motor continues to operate in the same direction to move the seat toward the full-forward position (FF). The seat is therefore moved past the desired final position ($P_x$) to the full-forward position at the front of the track and is maintained at the front of the track until the seat back is returned to the upright position. When the seat back is in the upright position, the memory seat recall operation is resumed, and the slide motor thereafter operates to move the seat directly to the desired final position ($P_x$), without any further action by the user.

Figure 6:
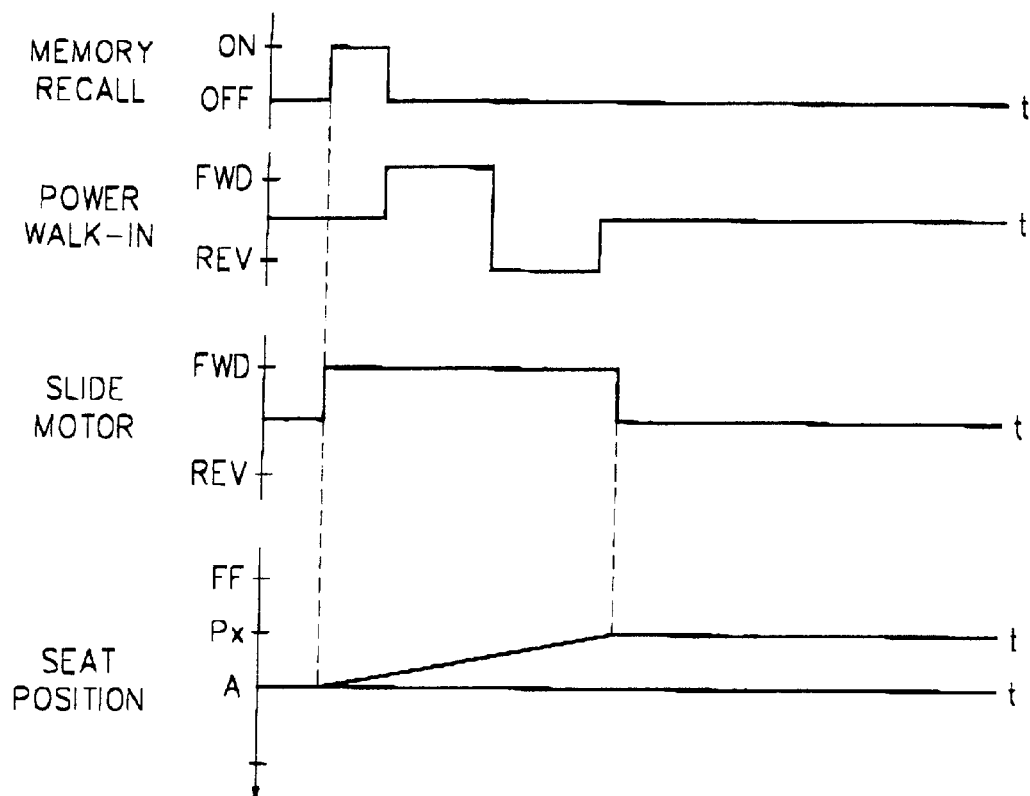
FIG. 6 schematically illustrates a third example of the second mode of operation of the power seat control according to the present invention; and, FIG. 7 schematically illustrates a fourth example of the second mode of operation of the power seat control according to the present invention.

Turning to FIG. 6, a third example for the second mode of operation is illustrated wherein the desired final position ($P_x$) is between the initial position (A) and the full-forward position (FF), and wherein the power walk-in operation is terminated prematurely. The memory seat recall operation is initiated and the seat moves from the arbitrary initial position (A) forwardly toward a desired final position ($P_x$). Before the seat reaches the desired final position ($P_x$), the power walk-in operation is initiated by moving the seat back into the folded-up position.

Upon initiation of the power walk-in operation, the memory seat recall operation is suspended, but the slide motor continues to operate in the same direction to move the seat toward the full-forward position (FF). In this example the seat back is returned to the upright position before the seat reaches the full forward position (FF) and before the seat passes the desired final position ($P_x$). Since the seat has not yet reached the desired final position ($P_x$), the slide motor continues to drive the seat forward to the desired final position, without any further action by the user. As can be appreciated, the movement of the seat toward the desired final position ($P_x$) in the third example is seamless and continuous to the user, despite the intervening transient power walk-in operation.

Figure 7:
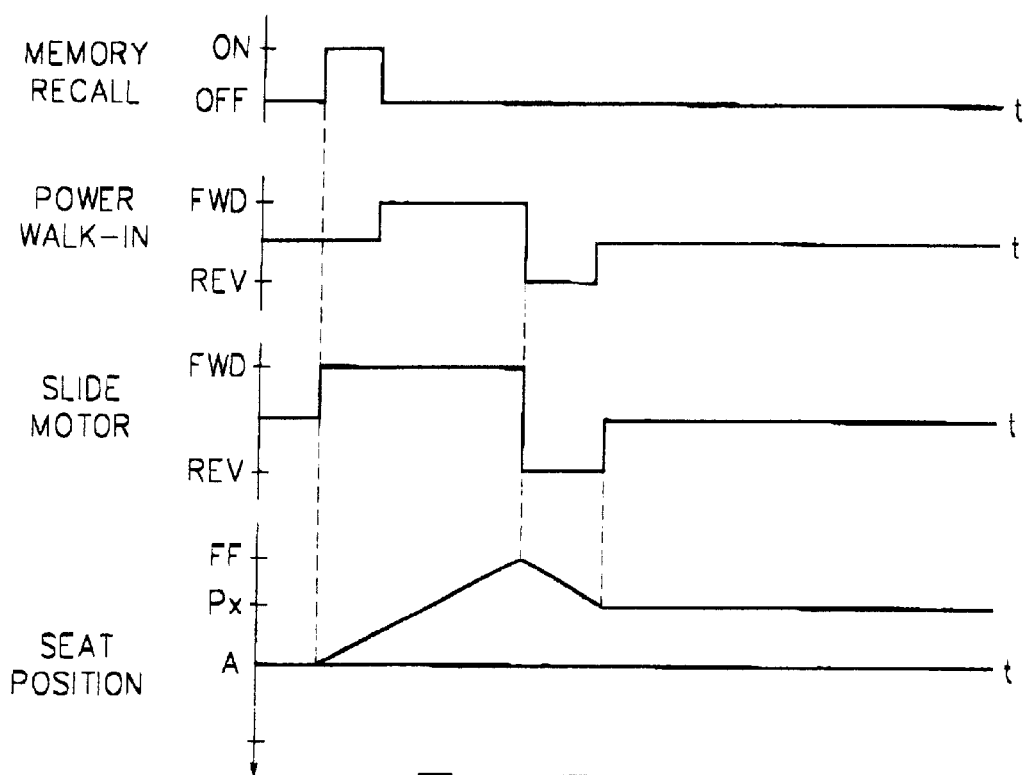

Turning to FIG. 7, a fourth example for the second mode of operation is illustrated wherein the desired final position ($P_x$) is between the initial position (A) and the full-forward position (FF), and wherein the power walk-in operation is terminated prematurely. The memory seat recall is initiated and the seat moves from an arbitrary initial position (A) forwardly toward a desired final position ($P_x$). Before the seat reaches the desired final position ($P_x$), the power walk-in operation is initiated by moving the seat back into the folded-up position.

Upon initiation of the power walk-in operation, the memory seat recall operation is suspended, but the slide motor continues in the same direction of operation to move the seat toward the full-forward position (FF). However, in this example the seat back is returned to the upright position after the seat has moved forward past the desired final position ($P_x$) but before the seat reaches the full forward position (FF). Accordingly, the slide motor reverses operation to drive the seat rearward to the desired final position ($P_x$), without any further action by the user.

Figure 1:
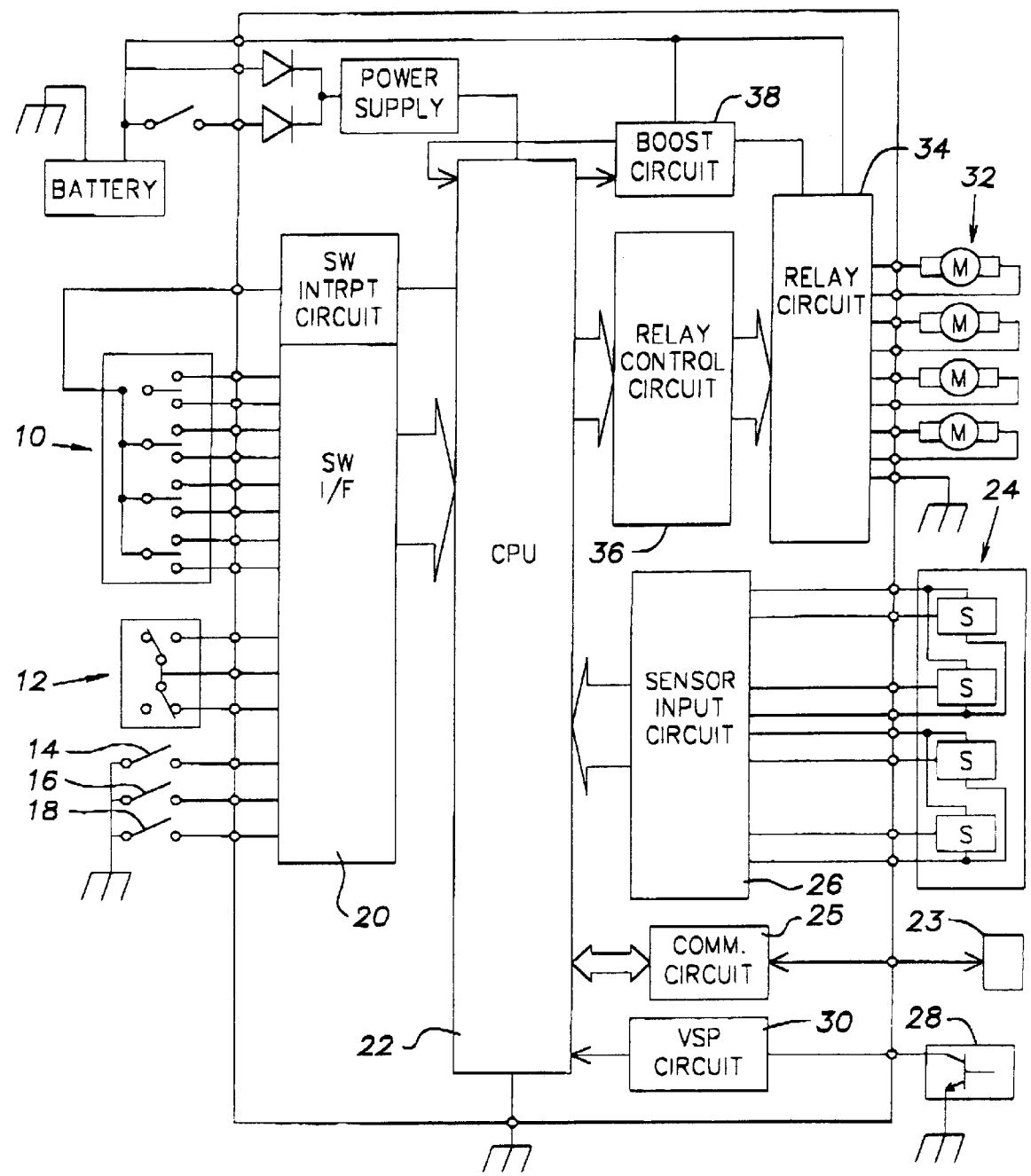
FIG. 1 is a schematic drawing of a power seat control circuit according to the present invention.

With reference to FIG. 1, a schematic drawing of the power seat control circuit diagram is provided. A plurality of switches are provided, including seat switches 10, recliner or seat back limit switches 12, a door switch 14, an automatic transmission park switch 16 and an automatic transmission reverse switch 18. Outputs of the switches 10, 12, 14, 16, 18 are fed into a switch interface 20 that is connected to the central processing unit 22. The seat switches 10 are used to manually adjust the seat by operation of the seat motors 34, as is well known in the art.

A memory recall circuit 23 communicates with the central processing unit 22 via a communications circuit 25. The switches 10 are manipulated to place the seat in a desired final position ($P_x$), as described hereinbefore. Thereafter, the desired position is stored in memory and recalled by actuation of the memory recall button/switch incorporated into the memory recall circuit 23. Plural desired final seat positions may thus be independently identified and stored in memory.

A plurality of sensors 24, preferably Hall sensors, are provided for sensing the position of the seat components. The output of these sensors is fed, via a sensor input circuit 26, to the central processing unit 22. A vehicle speed pulse sensor 28 is also provided to detect vehicle speed. The vehicle speed detected by the pulse sensor 28 is communicated to the central processing unit 22 via a vehicle speed pulse circuit 30.

The central processing unit 22 uses the condition of the vehicle speed pulse sensor 28, the door switch 14, the transmission park and transmission reverse switches 16, 18 to alternatively enable or disable the memory seat recall and power walk-in functions, as discussed hereinbefore. Assuming that these functions are enabled, the central processing unit 22 uses the condition of the seat switch 10, recliner switches 12, and the sensor inputs 24 to control operation of the motors 32, via a relay circuit 34 and a relay control circuit 36, to thereby perform the desired functions and place the seat in the desired final position, as described hereinbefore and illustrated in FIGS. 2–7.

The central processing unit 22 controls the operation of the motors 32, which include the slide motor, in accordance with the previously discussed examples to perform the desired power walk-in and memory seat recall operations. A boost circuit 38 is preferably provided to supply increased battery power to the motors 32 via the relay circuit 34 to thereby speed operation motors 32 and movement of the seat.

In each of the foregoing examples, it is noted that all of the functions desired by the user are sequentially performed without further input by the user. The seat is, accordingly, placed in the position desired by the user without unnecessary or duplicative operations by the user.

While the preferred embodiment of the present invention is shown and described herein, it is to be understood that the same is not so limited but shall cover and include any and all modifications thereof which fall within the purview of the invention.

What is claimed is:

1. An automobile power seat control method including a memory seat recall function and a power walk-in function, said memory seat recall function being user-activated to move the seat into a predetermined position, said power walk-in function being such that folding of the seat into a folded-up position causes the seat to move into a full forward position and returning the seat to a full-upright position causes the seat to return to an original position, the method comprising the steps of, when said power walk-in function and said memory seat recall functions are contemporaneously activated, controlling said seat in accordance with one of a first and second mode of operation, which of said first and second mode of operation being performed depends upon the sequence of activation of said memory seat recall and said power walk-in functions.

2. The automobile power seat control method according to claim 1, wherein, during said first mode of operation said power walk-in function is activated first and said memory seat recall function is activated during performance of said power walk-in function, activation of said memory seat recall suspending said power walk-in function.

3. The automobile power seat control method according to claim 2, wherein, following activation of said memory seat recall function, a subsequent movement of the seat back to the full-upright position will cause the seat to move to the original position.

4. The automobile power seat control method according to claim 1, wherein during said second mode of operation in which the power walk-in function is activated during performance of a memory seat recall function, said memory seat recall function being suspended in lieu of completion of said power walk-in function and, following completion of said power walk-in function, a remaining portion of said memory seat recall function is performed.

5. An automobile power seat control method, including a memory seat recall function and a power walk-in function, said memory seat recall function being user-activated to move the seat into a predetermined position, said power walk-in function being such that folding of the seat into a folded-up position causes the seat to move into a full forward position and returning the seat to a full-upright position causes the seat to return to an original position, the method comprising the steps of, when said memory recall function is being performed and said power walk-in function is activated, said method comprising the steps of:

suspending said memory seat recall function;
initiating a power walk-in function and thereby moving said seat toward the full forward position;
returning said seat to the full upright position; and,
completing said memory seat recall function and thereby moving the seat to the predetermined position.

6. The automobile power seat control method according to claim 5, wherein, when said memory seat recall function is initiated during said power walk-in function, said method comprising the further step of suspending said power walk-in function.

7. The automobile power seat control method according to claim 6, wherein, following activation of said memory seat recall function, a subsequent movement of the seat back to the full-upright position will cause the seat to move to the original position.

* * * * *